(12) United States Patent
Cabak

(10) Patent No.: US 7,707,681 B1
(45) Date of Patent: May 4, 2010

(54) WINDSHIELD WIPER CLIP AND BUG REMOVER

(76) Inventor: Alan Cabak, 715 Grand Ave., Hawkins, WI (US) 54530

( * ) Notice: Subject to any disclaimer, the term of this patent is extended or adjusted under 35 U.S.C. 154(b) by 1085 days.

(21) Appl. No.: 10/966,583

(22) Filed: Oct. 14, 2004

Related U.S. Application Data

(60) Provisional application No. 60/511,561, filed on Oct. 14, 2003.

(51) Int. Cl.
*B60S 1/38* (2006.01)
*B60S 1/28* (2006.01)
(52) U.S. Cl. ............ 15/250.41; 15/250.31; 15/250.361; 15/250.452
(58) Field of Classification Search ............ 15/250.451, 15/250.41, 250.4, 250.361, 250.452, 250.453, 15/250.454, 250.31
See application file for complete search history.

(56) References Cited

U.S. PATENT DOCUMENTS

| | | | |
|---|---|---|---|
| 1,953,703 A | | 4/1934 | Dirienzo |
| 2,011,015 A | * | 8/1935 | Schleicher ................. 15/250.4 |
| 2,085,608 A | | 6/1937 | Rodrick |
| 2,203,071 A | | 6/1940 | Zaiger |
| 2,273,817 A | | 2/1942 | Chellew |
| 3,138,816 A | | 6/1964 | Abodeely |
| 3,393,524 A | | 7/1968 | Knights |
| 3,667,083 A | * | 6/1972 | Linker ....................... 15/250.06 |
| 3,958,295 A | * | 5/1976 | Green et al. ............. 15/250.39 |
| 4,177,538 A | * | 12/1979 | Blaiklock et al. ........ 15/250.39 |
| 4,339,839 A | | 7/1982 | Knights |
| 4,611,364 A | | 9/1986 | Gruber |
| 4,719,661 A | | 1/1988 | Hanselmann |

(Continued)

FOREIGN PATENT DOCUMENTS

EP 0232598 * 8/1987

(Continued)

OTHER PUBLICATIONS

Oct. 2008 Translation of EP patent 0537093 to Ortillez published Apr. 14, 1993.*

(Continued)

*Primary Examiner*—Gary K Graham
(74) *Attorney, Agent, or Firm*—Anthony J. Bourget

(57) ABSTRACT

The present invention is directed to a windshield wiper clip adapted for connecting a scrubbing blade to a windshield wiper, the clip comprising a base member; a first end wall connected to the base member and a second end wall connect to the base member opposite the first end wall, a first top component to the first end wall and a second top component connected to the second end wall; at least one further top component connected to the base member, the further top component including at least one finger projection, the at least one finger projection, base member, first end wall and first top component defining a scrubber receiving portion, and at least one of the finger projections, the base member, second end wall and second top component defining a wiper receiving portion; wherein the clip connects a scrubber to a wiper in order to accommodate bug removal during movement of the wiper about a windshield. The invention also includes and integrated clip and scrubber, as well as wiper-scrubber system. A novel scrubber mount having rounded shoulders is also described.

9 Claims, 14 Drawing Sheets

U.S. PATENT DOCUMENTS

| | | | |
|---|---|---|---|
| 5,235,720 A | 8/1993 | Kinder | |
| 5,255,407 A | 10/1993 | Yang | |
| 5,301,384 A | 4/1994 | Perry | |
| 5,327,615 A | 7/1994 | Green | |
| 5,406,672 A | 4/1995 | Hipke | |
| 5,778,483 A | 7/1998 | Dawson | |
| 6,505,378 B1 * | 1/2003 | Squires | 15/250.41 |

FOREIGN PATENT DOCUMENTS

EP             0537093    *   4/1993

OTHER PUBLICATIONS

Merriam-Webster, pliable—Definition from the Merrian-Webster Online Dictionary, http://www.merriam-webster.com/dictionary/pliable, Mar. 5, 2009.

* cited by examiner

WINDSHIELD WIPER CLIP AND BUG REMOVER

CROSS-REFERENCE TO RELATED APPLICATIONS, IF ANY

Applicants claim priority based on U.S. Provisional Patent Application No. 60/511,561 filed Oct. 14, 2003.

STATEMENT REGARDING FEDERALLY SPONSORED RESEARCH OR DEVELOPMENT

Not applicable.

REFERENCE TO A MICROFICHE APPENDIX, IF ANY

Not applicable.

BACKGROUND OF THE INVENTION

1. Field of the Invention

The present invention is concerned with the field of vehicle windshield wipers. More specifically, the invention is concerned with windshield wipers that are constructed with a removable brush or scrubbing device that functions to effectively remove bugs from the windshield of a vehicle during normal operation of the wipers.

2. Background Information

In certain geographic locations and climates, it is common for airborne and other types of bugs and insects to collide with and become attached to the windshield of a vehicle. The accumulation of such bugs and insects onto the windshield is greatest when the vehicle is being operated, but significant accumulation is known to occur when the vehicle is stationary for a period of time. Removal of bugs and insects attached to the windshield is imperative to ensure safe operation of the vehicle; as such accumulation can significantly impair the driver's vision and line of sight. The most effective means of removing the accumulated bugs and insects is to hand wipe the windshield with a towel and solvent or cleaner. However, this form of cleaning is not always possible or feasible during operation of a moving vehicle. In such instances, the driver must rely on using windshield wipers, which are designed to remove accumulation of water rather than bugs or insects. The wiper blades, for instance, are usually constructed of rubber or similarly flexible material in order to conform to the sloped surface of the windshield for effective removal of water or other liquids. However, wiper blades are generally ineffective in removing or dislodging material or items, such as bugs or insects that are stuck, bonded, or otherwise attached to the exterior surface of a windshield. In such cases, it has been found that a brush-like device attached to the windshield wiper, with means to adjust the pressure applied by the device to the windshield, is most effective in removing bugs or insects attached or stuck thereon.

Numerous designs for windshield wipers have been provided in the prior art. Even though these designs may be suitable for the specific individual purposes to which they address, they would not be suitable for the purposes of the present version of the invention; as such designs do not include specific means or devices for removing bugs or insects that have become attached to the windshield of a vehicle. These designs are exemplified by U.S. Pat. No. 4,611,364, Windshield Wiper For Land, Sea, and Marine Vehicles, In Particular For Trucks (Lorries) and Passenger Automobiles, issued to Grubner on 16 Sep. 1986; U.S. Pat. No. 4,719,661, Cleaning Device For Motor Vehicle Window Panes, issued to Hanselmann on 19 Jan. 1988; U.S. Pat. No. 5,235,720, Windshield Wiper Assembly with Scrubbing Blade, issued to Kinder on 17 Aug. 1993; U.S. Pat. No. 5,255,407, Multi-Scrubber Type Roller Windshield Wiper, issued to Yang on 26 Oct. 1993; U.S. Pat. No. 5,301,384, Windshield Scrubber and Blade Wiping Assembly, issued to Perry on 12 Apr. 1994; U.S. Pat. No. 5,327,615, Windshield Wiper Blade Assembly Including Conical Cleaning Tips, issued to Green on 12 Jul. 1994; and U.S. Pat. No. 5,406,672, Windshield Wiper System Including Wiping and Scrubbing Blades, issued to Hipke on 18 Apr. 1995, among other patents. As such, it may be appreciated that there is a continuing need for a new windshield wiper with means to remove bugs that are attached to a windshield. In these respects, the present invention substantially departs from the conventional concepts and designs of the prior art, and in so doing provides an apparatus that substantially fulfills this need. Additionally, these patents and commercial techniques do not suggest the present inventive combination of component elements arranged and configured as disclosed herein.

The present invention achieves its intended purposes, objects, and advantages through a new, useful and unobvious combination of method steps and component elements, with the use of a minimum number of functioning parts, at a reasonable cost to manufacture, and by employing only readily available materials.

SUMMARY OF THE INVENTION

The present invention, which will be described in greater detail hereinafter, relates to the field of vehicle windshield wipers. More specifically, the invention is concerned with a clip which is attachable to a common windshield wiper and which also receives a removable brush or scrubbing device that functions to effectively remove bugs from the windshield of a vehicle during normal operation of the wipers. Described briefly, according to one embodiment, the invention presents a clip which attachable to a windshield wiper. The clip includes A fastener mounted to the central portion of the wiper frame secures the wiper to an actuating arm.

In another embodiment of the invention, the clip is integrally connected to the scrubbing device.

The invention, therefore, resides not in anyone of these features per se, but rather in the particular combination of all of them herein disclosed. It is distinguished from the prior art in this particular combination of all of its structures for the functions specified. In order that the detailed description of the invention may be better understood and that the present contribution to the art can be more fully appreciated, additional features of the invention will be described hereinafter. It should be appreciated by those skilled in the art that the conception and the disclosed specific methods and structures might be readily utilized as a basis for modifying or designing other structures for carrying out the same purposes of the present invention. It should be realized by those skilled in the art that such equivalent methods and structures do not depart from the spirit and scope of the invention.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting. As such, those skilled in the art will appreciate that the conception, upon which this disclosure is based, may readily be utilized as a basis for the designing of other structures, methods and systems for carrying out the several purposes of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application nor is it intended to be limiting as to the scope of the invention in any way.

Accordingly, it is an object of the invention to provide a low-cost, easy-to-manufacture, and easy-to-market windshield wiper clip for clipping to the wiper a means to remove bugs from a windshield.

A further object of the invention is to provide an easy-to-use and versatile windshield wiper bug removal means that is clipable to the wiper to remove bugs from a windshield. A significant object of the invention is to provide a windshield wiper with means to remove bugs from a windshield that includes a clip attaching an elongated brush or brush-like device to the wiper for removal of bugs and insects attached to the exterior surface of a windshield.

A further object of one embodiment of the invention is to provide an integrated windshield wiper scrubber and clip for attachment to a windshield wiper.

For a better understanding of the invention, its operating advantages and the specific objects attained by its uses, reference should be made to the accompanying drawings and descriptive matter in which there is illustrated a preferred embodiment of the invention. The foregoing has outlined some of the more pertinent objects of the invention. These objects should be construed to be merely illustrative of some of the more prominent features and applications of the present invention. Many other beneficial results can be attained by applying the disclosed invention in a different manner or by modifying the invention within the scope of the disclosure.

The above summary of the present invention is not intended to describe each illustrated embodiment or every implementation of the present invention. Accordingly, other objects and a fuller understanding of the invention may be had by referring to the summary of the invention and the detailed description of the embodiments, in addition to the scope of the invention illustrated by the accompanying drawings and claims.

BRIEF DESCRIPTION OF THE DRAWINGS

The foregoing and other objects, features and advantages of the invention will become more fully understood from the following description of the preferred embodiment of the invention, as illustrated in the accompanying drawings in which like reference characters refer to the same parts throughout different views. The drawings are not necessarily to scale, with emphasis instead being placed upon illustrating the principles of the invention.

Figure 1:
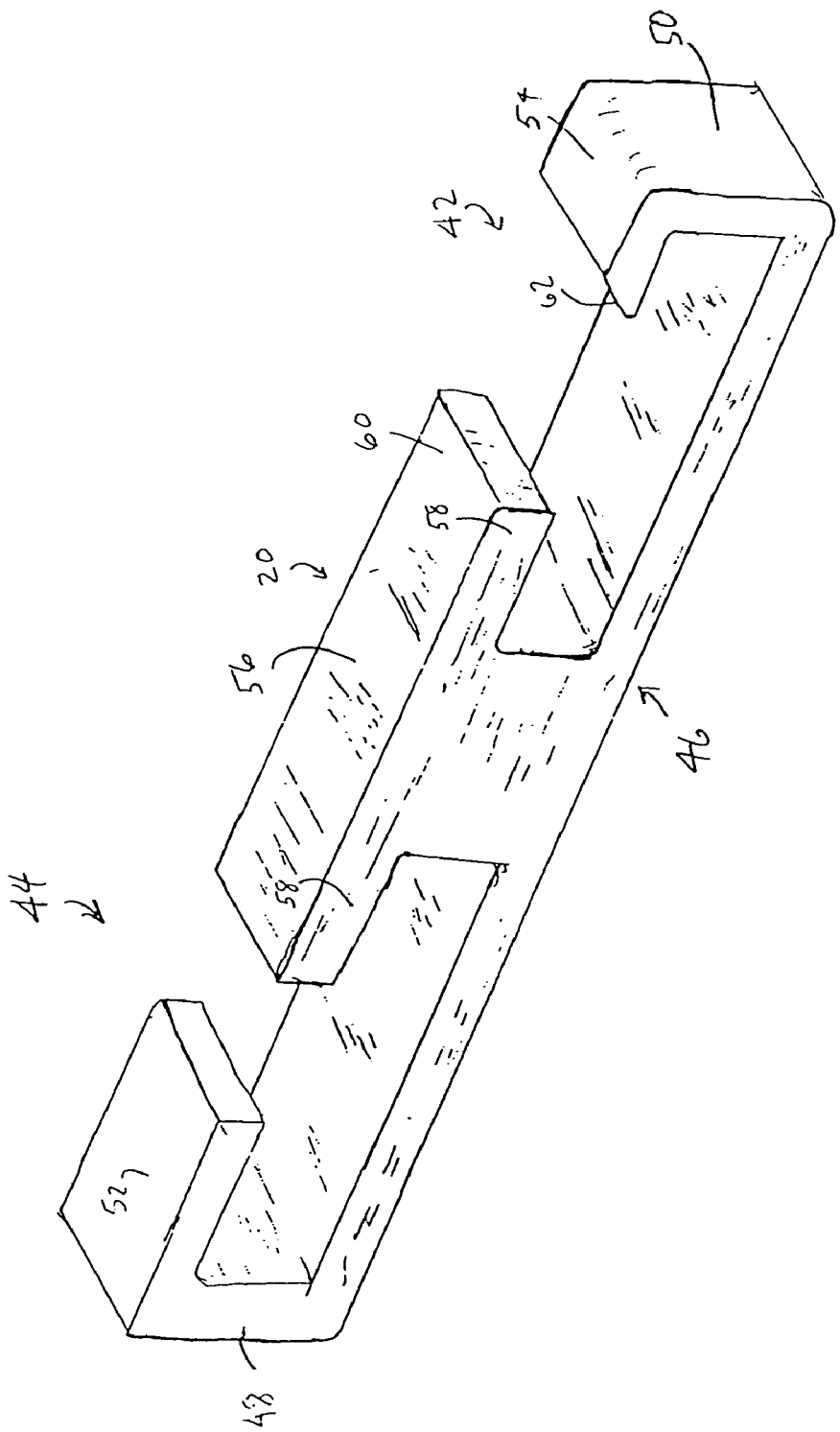
FIG. 1 is a perspective view of a windshield wiper clip in accordance with one embodiment of the present invention.

While the invention is amenable to various modifications and alternative forms, specifics thereof have been shown by way of example in the drawings and will be described in detail. It should be understood, however, that the intention is not necessarily to limit the invention to the particular embodiments described. On the contrary, the intention is to cover all modifications, equivalents, and alternatives falling within the spirit and scope of the invention as defined by the appended claims.

DESCRIPTION OF THE EMBODIMENTS

Figure 2:
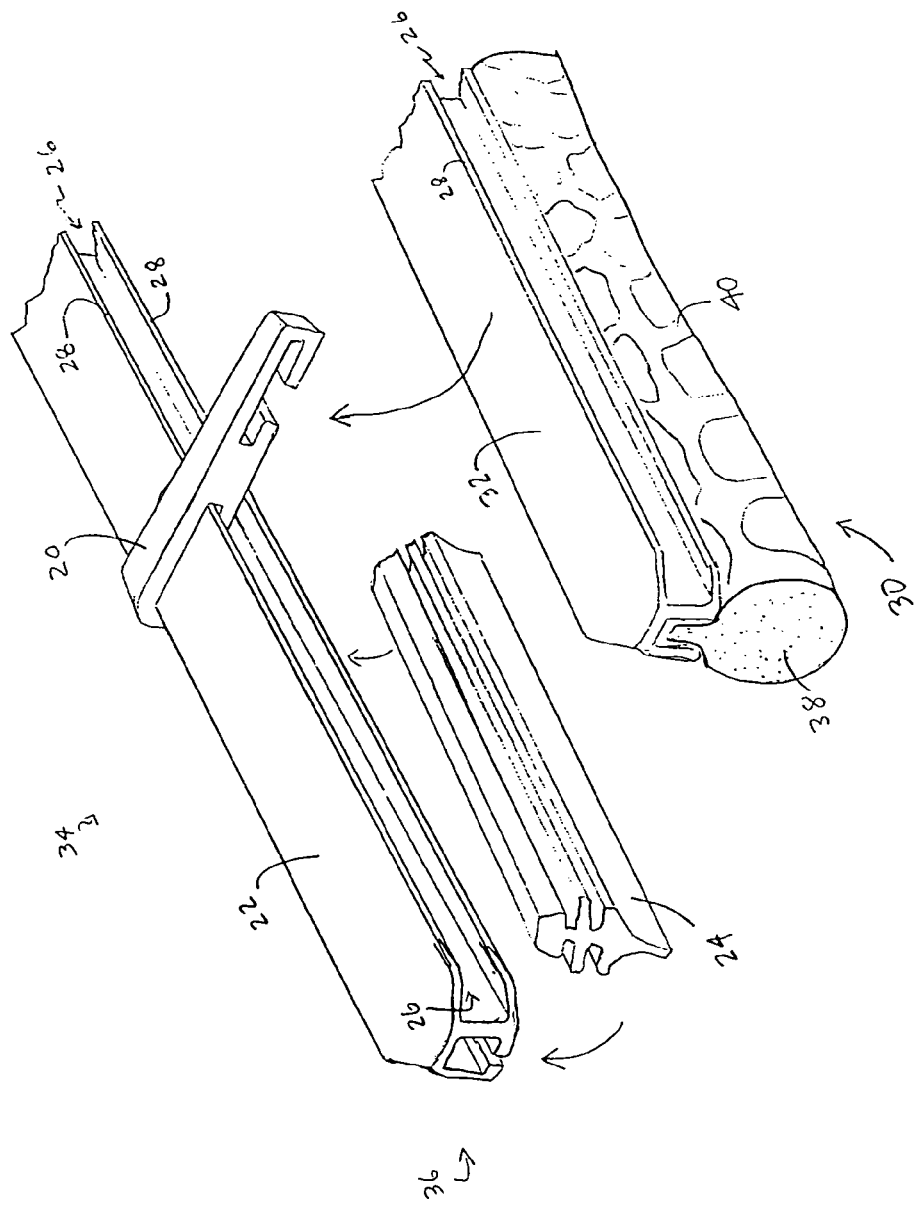
FIG. 2 is a partial perspective view of a wiper clip attached to a single blade wiper in accordance with the present invention and showing a scrubber unattached to the clip.
Figure 3:
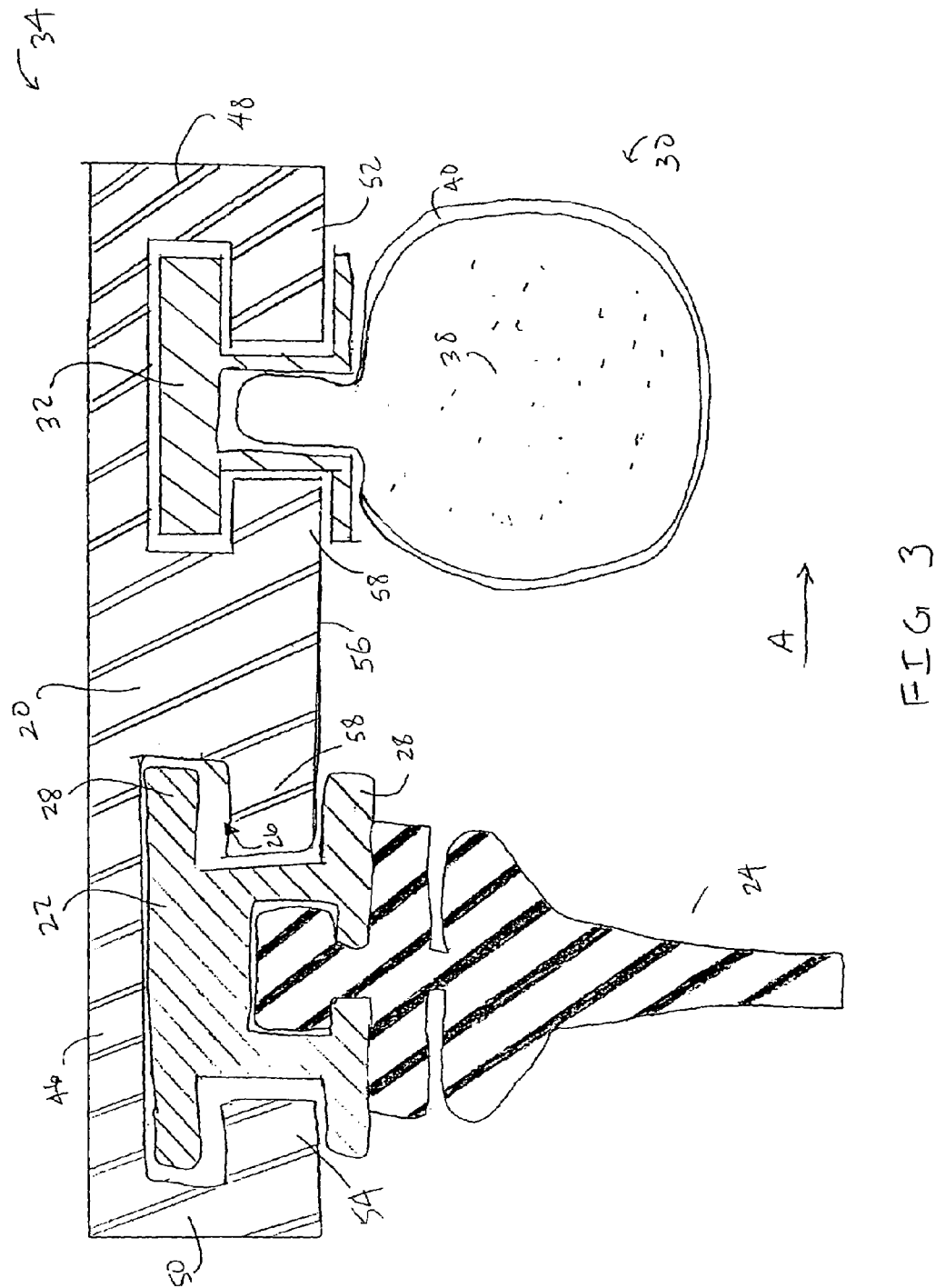
FIG. 3 is a cross-section view of a windshield wiper clip positioned within a wiper and scrubber system in accordance with the present invention.
Figure 4:
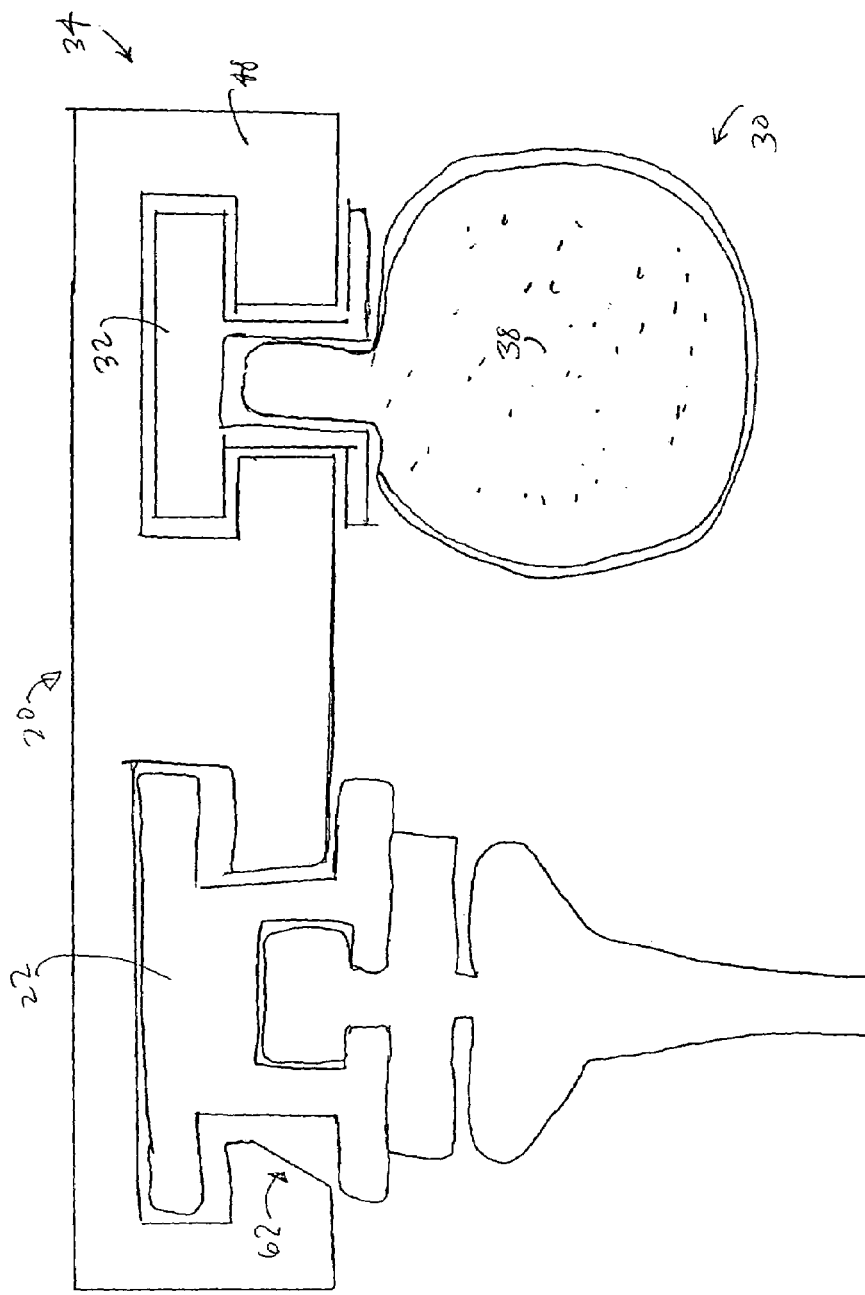
FIG. 4 is a cross-section of a further embodiment of a wiper clip positioned within a wiper and scrubber system in accordance with the present invention.

Referring now to the drawings wherein there are illustrated several typical embodiments of the windshield clip 20 and wiper system 34. Referring to FIGS. 1-3, one embodiment of the present clip invention 20, intended for use with a wide variety of windshield wipers typically having a wiper mount 22 (or other similar mount) is constructed generally of a base member 46. Base member 46 is generally planer and preferably lies flat in order to maintain a low profile. Clip 20 is adapted for connecting a scrubber 30 to a windshield wiper 36. Clip 20 includes a first end wall 48 which is preferably integrally connected to the base member 46. A second end wall 50 is also preferably integrally connected to the base member 46 opposite the first end wall 48 as shown in FIG. 1. The material used for making clip 20 is preferably of plastic. A first top component 52 is preferably integrally connected to the first end wall 48 in a right angle fashion as shown. Likewise, a second top component 54 is preferably integrally connected to the second end wall 50 as shown. A further top component 56 is preferably integrally connected to the base member 46 on an upper side of base member 46. Further top component 56 includes at least one finger projection 58. Finger projection 58, base member 46, first end wall 48 and first top component 52 define a scrubber receiving portion 44. Scrubber receiving portion 44 receives a scrubber 30. Scrubber rail 32 may be slidably inserted into scrubber receiving portion 44. Side rails 28 are included on scrubber rail 32 to hold scrubber into position. Scrubber 30 preferably includes a foam/sponge 38 which is adhered to scrubber rail 32. Web 40 is included about scrubber 30. At least one finger projection 58, base member 46, second end wall 50, and second top component 54 define a wiper receiving portion 42. Wiper receiving portion 44 is clipped onto wiper mount 22. Preferably clip 20 includes taper 62 (See FIG. 4) which is angled to assist in pressing of clip 20 onto wiper mount 22 which generally snaps into position. One type of wiper mount which is shown includes side rails 28 which catch clip 22 for secure positioning. It may be appreciated that clip 20 may slide along wiper mount 22. A wiper blade 24 is attached to wiper mount 22 in common fashion. Wiper 36 includes side grooves 26 into which finger projections 58 and first and second top components 52, 54 insert. As shown in FIG. 4 clip 20 includes taper 62 which accommodates for easier insertion upon wiper mount 22. In application base member 46 will flex such that wiper receiving portion 42 expands to allow insertion over wiper mount 22. Once clipped in place, clip 20 accommodates for securing scrubber 30 adjacent and in a parallel relationship to wiper blade 24. As shown in FIG. 3 foam 38 has lower profile than wiper blade 24. Thus, when the wiper system 34 travels in the direction of arrow A (see FIG. 3) the mechanics of movement provide rotation of wiper 36 to allow scrubber to contact a windshield to be wiped. When the wiper travels opposite direction A the scrubber 30 "picks up" so that it is no longer in contact with the windshield. Clip 20 accommodates for scrubber 30 to be positioned so that "pick up" occurs by the natural movement of wiper 36. Allowing a lower profile for foam 38 together with the natural mechanical action and rotation of the wiper 36 upon the windshield allows for this "pick up". Such pick up accommodates for lessening of streaking upon the windshield and accommodates for bugs being scraped all to one direction. It may be appreciated that the clip can be attached to either a right or left side of a wiper 36 to accommodate for preferred scrubbing action.

Figure 5:
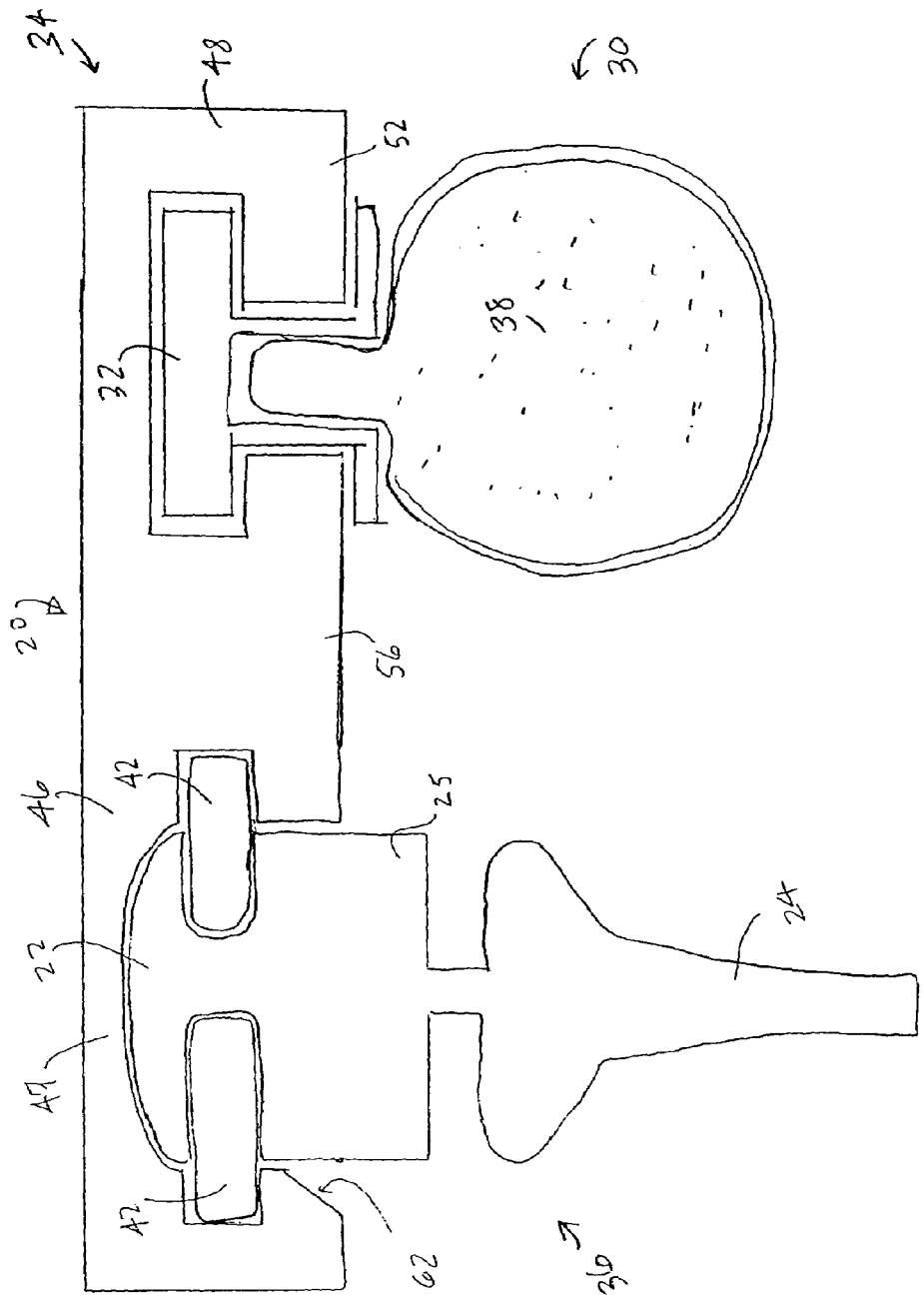
FIG. 5 is a cross-section of a wiper clip illustrating attachment to a further variety of a single-blade wiper.
Figure 11:
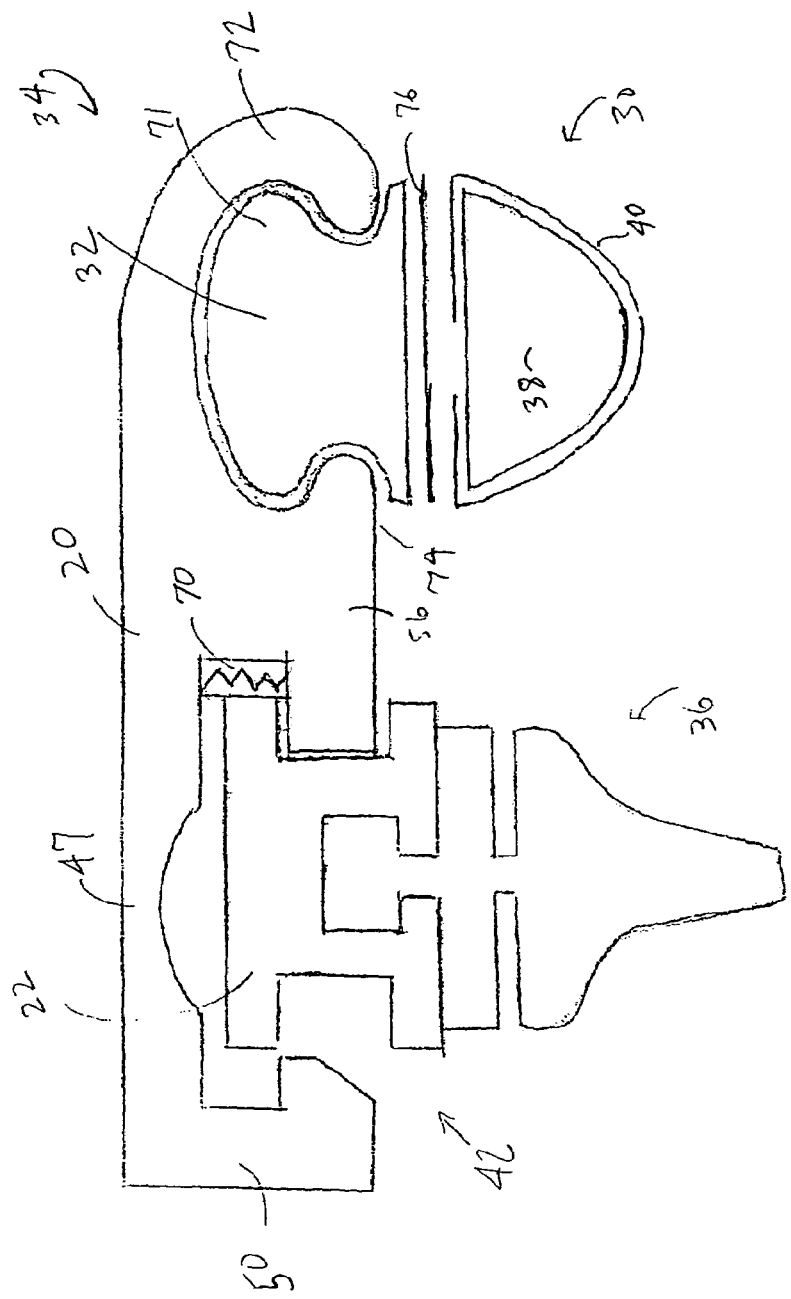
FIG. 11 is a cross-section of a further aspect of a wiper clip connecting a wiper and scrubber including a compressed biasing element.

Referring to FIG. 5, a further embodiment of clip 20 is shown. This clip 20 accommodates connection to a different form of wiper having a generally rounded wiper mount 22. A wiper of this variety also commonly has metal guides 42 running longitudinally along the wiper 36. In this embodiment base member 46 includes depression 47 to accommodate for the cross section configuration of wiper mount 22. The depression 47 may be modified to accommodate varying configurations of wiper mount 22. FIG. 11 shows a further configuration of clip 20 to accommodate yet a further type of wiper mount 22 where the metal guides 42 which run longitudinally are flush to the wiper neck 25. In this configuration finger projection 58 projects into wiper neck groove 27.

Figure 6:
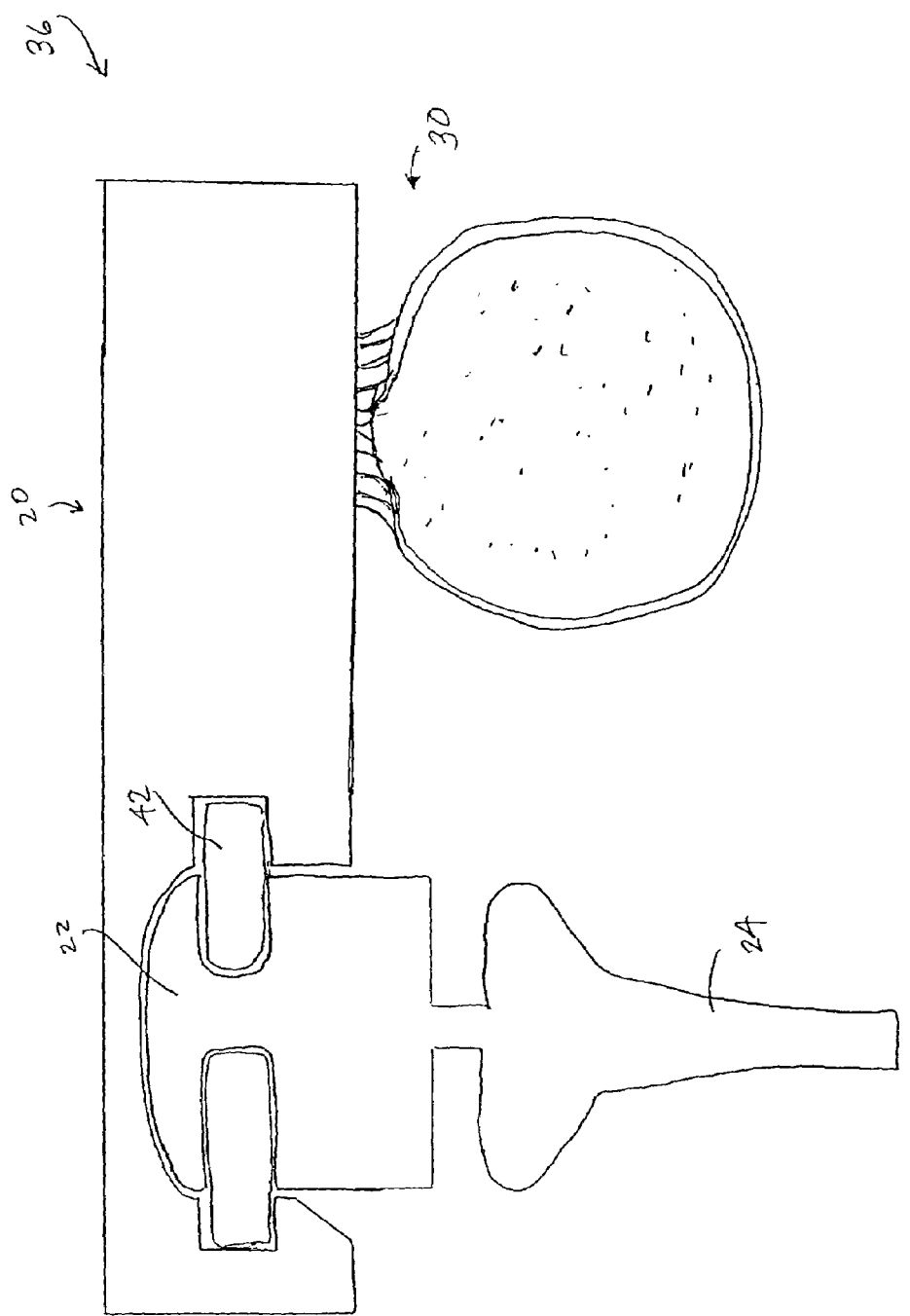
FIG. 6 is a cross-section of an integrated scrubber and wiper clip in accordance with the present invention.

Referring to FIG. 6 scrubber 30 includes integrally connected clip 20. It may be appreciated that a number of clips 20 can be utilized to accommodate longitudinal connection of a scrubber 30 to a wiper 36. Preferably at two clips 20 are utilized.

Figure 7:
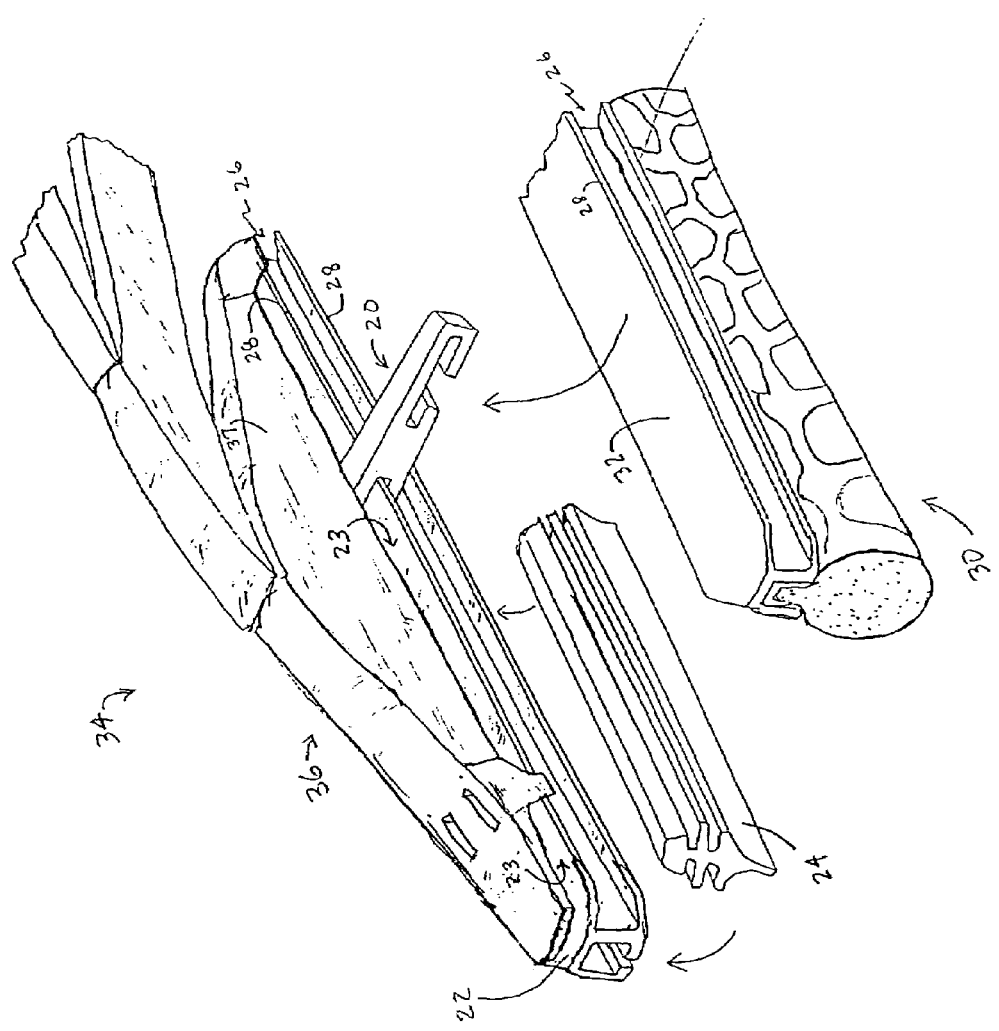
FIG. 7 is a perspective view of a wiper clip and wiper clip system in accordance with the present invention.

Referring to FIG. 7, a wiper system 34 includes a wiper 36 having a connected scrubber 30. Clip 20 is positioned within wiper mounting gap 23. Wiper mounting gap is generally defined by wiper mount 20 and wiper finger 37. Due to the low profile and generally flat planer features of base member 46, clip 20 may be conveniently inserted into wiper mounting gap 23 for connection to wiper 36. Moreover, clip 20 may thereby slide longitudinally along side groove 26 to accommodate optimal positioning for the connection.

Clip 20 includes upper face 60 which generally lies on a plane defined by second top component 54. Preferably clip 20 includes a substantially flat planer side positioned opposite upper face 60. Such flat planer bottom face side accommodates easier insertion within gap 23. It may be appreciated that a number of clips 20 can be inserted along gap 23 as preferred.

Figure 8:
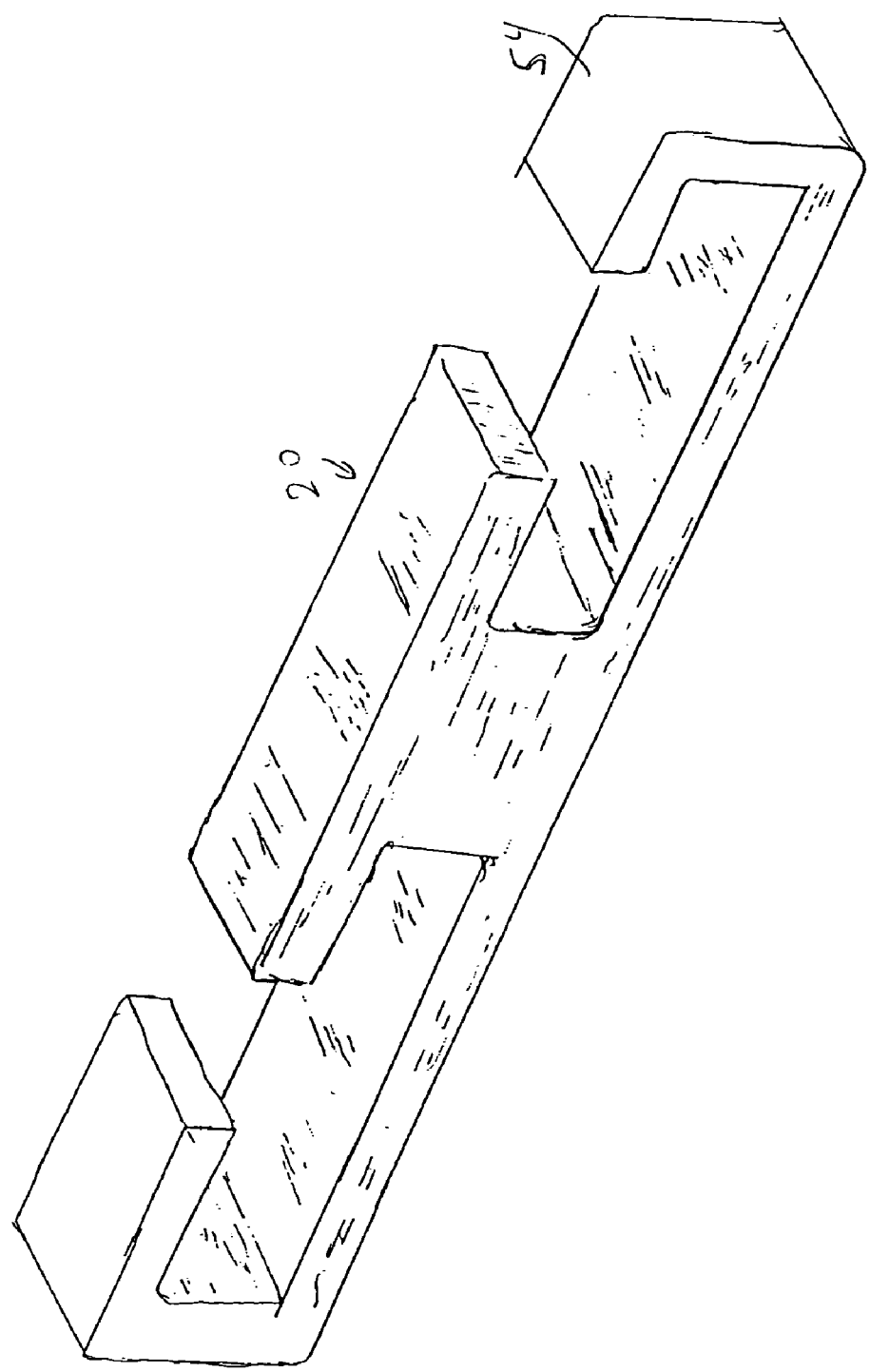
FIG. 8 is a perspective view of a wiper clip in accordance with the present invention.

Referring to FIG. 8, clip 20 includes second top component 54 which lacks a taper 62.

Figure 9:
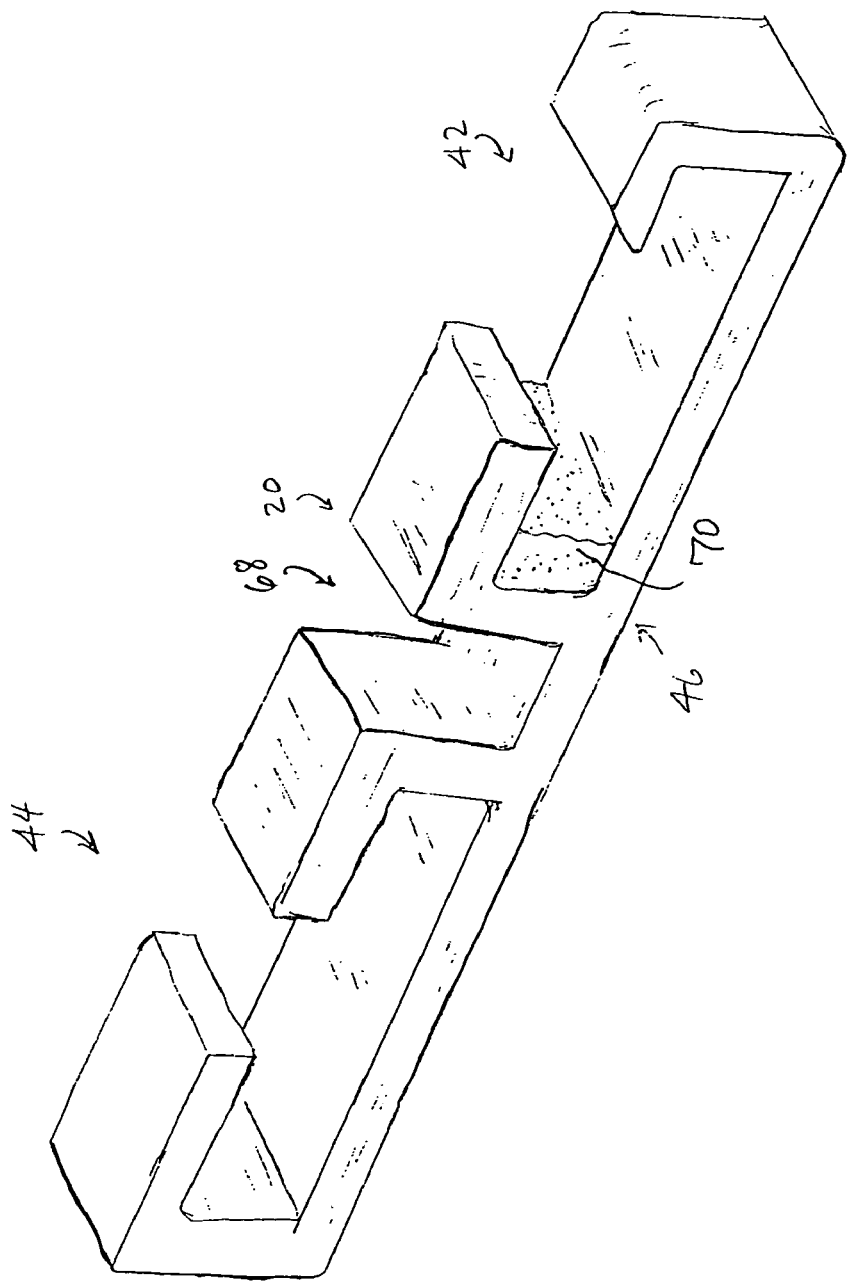
FIG. 9 is a perspective view of a wiper clip in accordance with the present invention.

Referring to FIG. 9, clip 20 includes space 68. Configuring clip 20 to have substantially equal thickness throughout all components assists in speed of production and cooling timing/manufacture.

Figure 10:
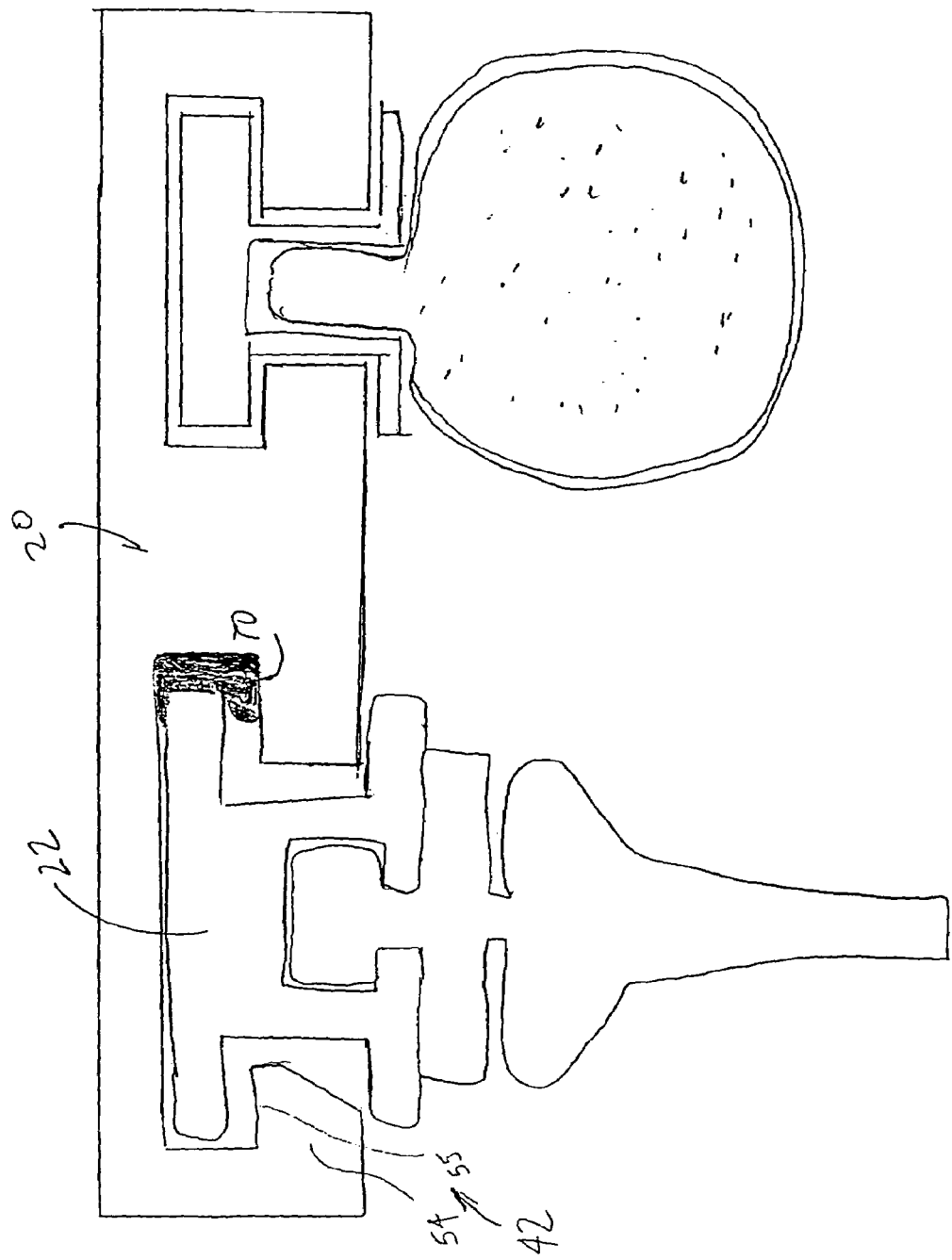
FIG. 10 is a cross-section of a wiper clip connecting a wiper and scrubber and including a biasing element.

Referring to FIG. 10, clip 20 includes bias 70 positioned within wiper receiving portion 42. Preferably bias is of a pliable foam or sponge-like material which provides a snug fit upon connection when clip 20 is connected with wiper mount 22. Bias 70 operates to secure clip 20 into place and reduces slipping. Bias 70 allows for a snug fit and is preferably glued in position but it may be held by friction. Preferably bias 70 has a thickness such that wiper mount 22 may compress bias 70 within wiper receiving portion 42 so that clip 20 may also be removed from wiper 36. As bias 70 is compressed, top component 54 tends to slide in a position for easier removal from side groove 26. Removal of clips 20 and scrubber 30 is preferred for seasonal non-use and storage.

Figure 12:
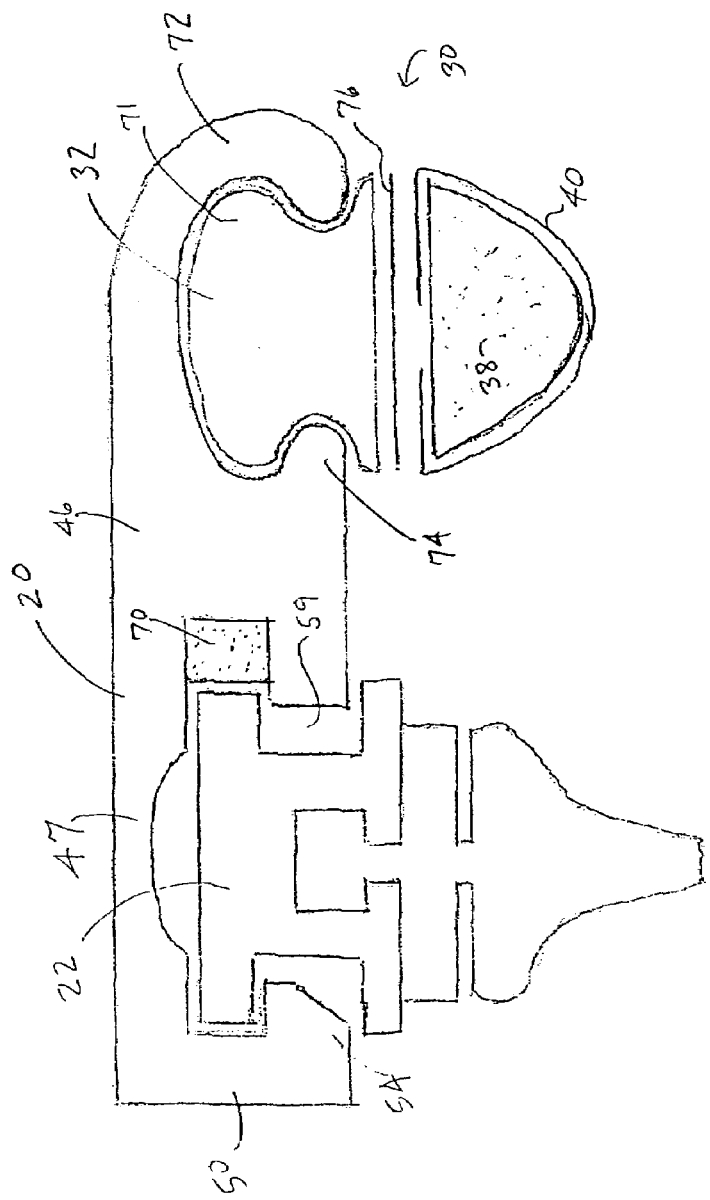
FIG. 12 is a cross-section of a further aspect of the present invention wherein a biasing element is not compressed.

As shown in FIG. 11, wiper 36 is urged toward the center of clip 20 so as to compress bias 70 which in turn allows wiper mount 22 a clearance position for removal from wiper receiving portion 42. FIG. 11 also shows a further embodiment of the clip 20 which includes a hook-like end 72. End 72 is configured to receive scrubber rail 32 which includes shoulder 71. Top component 56 may also include lip 74 to accommodate an equivalent structure opposite hook-end 72 as shown. Adhesive or tape 76 is used to attach foam or sponge-like scrubber 38 to scrubber rail 32. It can be appreciated that variations in the type of scrubber rail 32 may be accommodated by like alterations to clip 20 as desired. Clip 20 also includes depression 47 to also universally fit a variety of wipers, including the variety having a rounded-top mount 22. FIG. 12 illustrates the aspects of FIG. 11 where the bias is not compressed. It can be appreciated that the tolerances between clip 20 and wiper mount 22 can be very small and preferably the components contact each other tightly. It may also be appreciated that void 59 may be necessary in order to allow compression of bias 70 so that mount 22 may slide.

Figure 13:
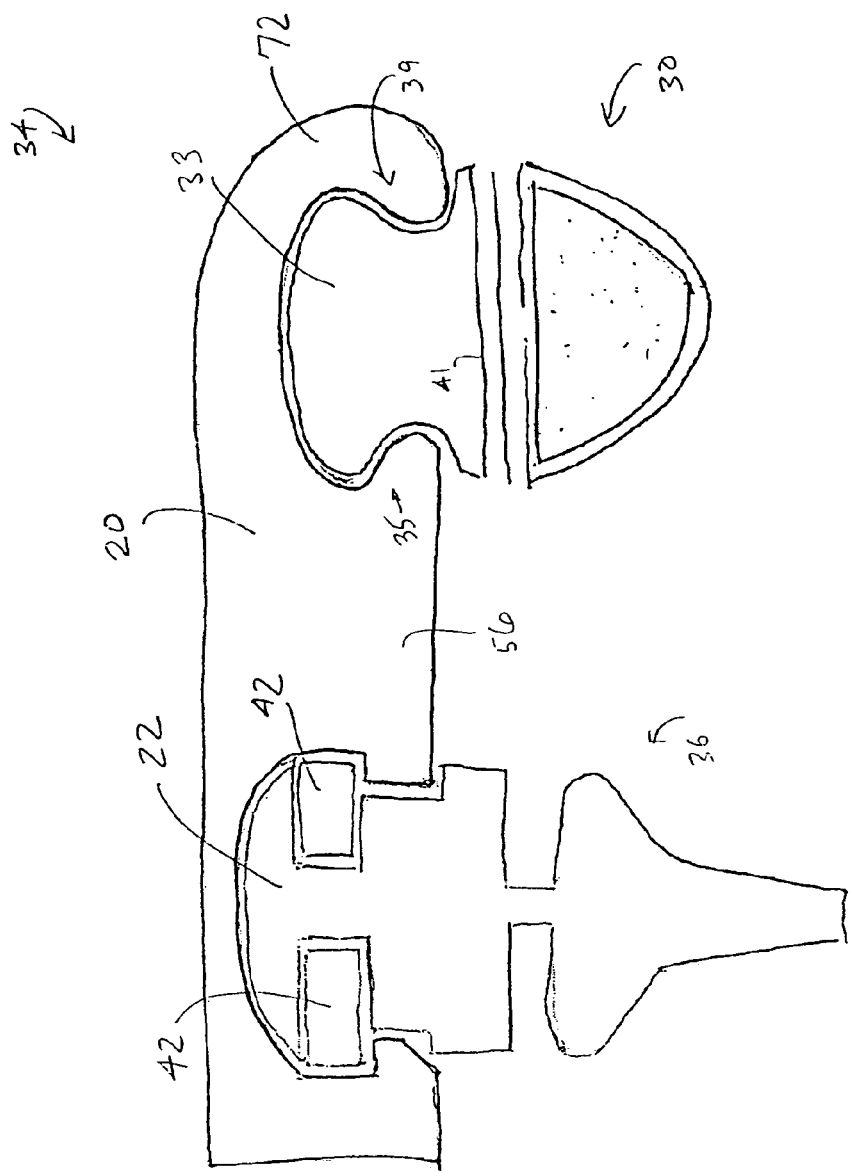
FIG. 13 is a cross-section of a clip attached to yet a further variety of a wiper according to the present invention.

FIG. 13 illustrates a further embodiment of clip 20 secured to a further variety of wiper 36. In this case wiper 36 includes rails 42 of narrow profile as compared to those shown in FIG. 5. In this aspect of the invention, clip 20 is not intended to be readily removed from wiper 36.

Figure 14:
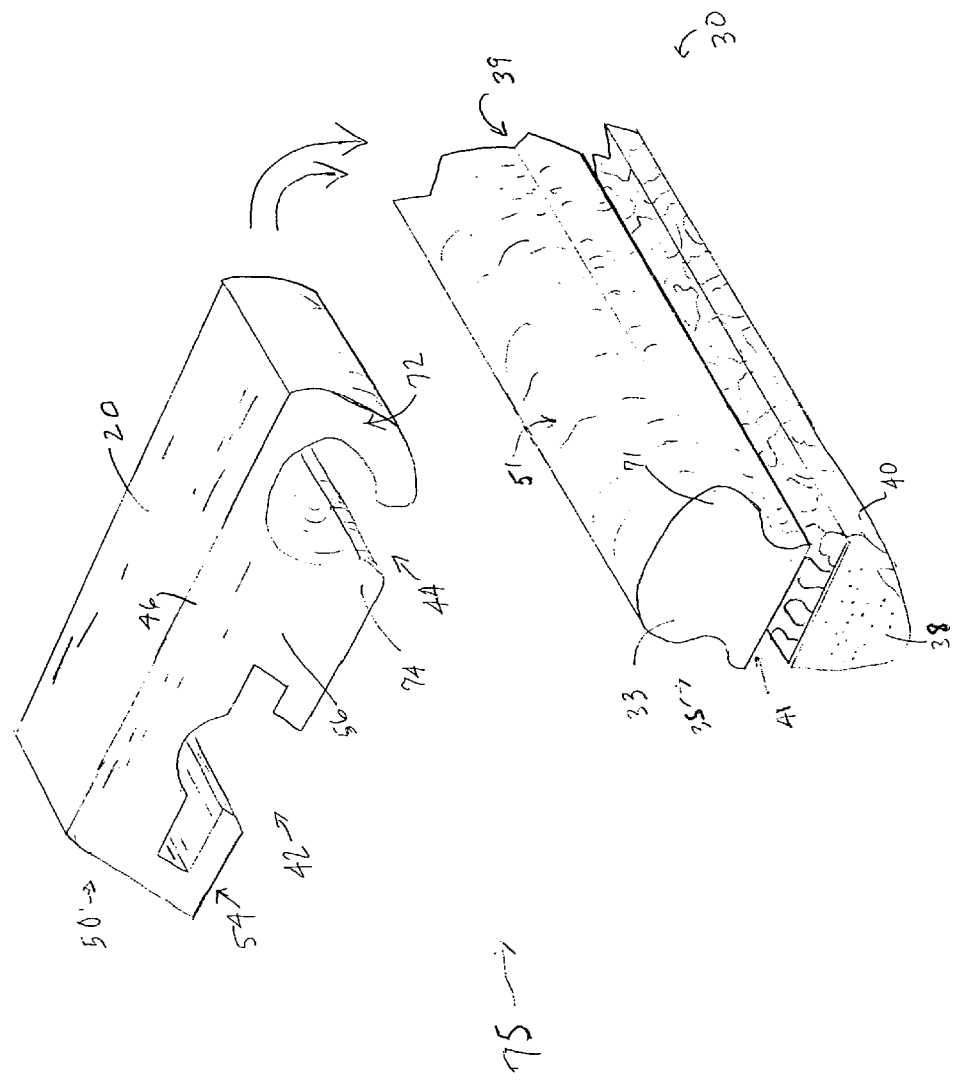
FIG. 14 is a partial exploded perspective view of a scrubber and clip assembly, and novel scrubber mount made in accordance with the present invention.

FIG. 14 illustrates a further embodiment of the present invention. One aspect includes a windshield scrubber and clip assembly 75 for attachment to a wiper system 34. A further aspect is directed to a novel scrubber mount 33. The assembly 75 includes an elongated scrubber mount 33 having a generally flat bottom 42, a generally rounded top 51, a left side 35 having a generally S-shaped bound and a right side 39 having a generally inverted S-shaped bound (See also FIG. 13). A generally elongated foam scrubber 38 is engaged with the mount 33 at the bottom 41. The assembly includes a clip 20 made generally in accordance with the above disclosure. Particular features include clip 20 having a base member 46, a hook-like end 72 integrally connected to the base member 46, an end wall 50 integrally connected to the base member 46 opposite the hook-like end 72. A first top component 54 is connected to the end wall 50 and at least one further top component 56 is integrally connected to the base member 46. The further top component 56 includes at least one finger projection. The finger projection, base member 46, end wall 50 and top component 54 define a wiper receiving portion 42.

The base member 46 and hook-like end 72 define a scrubber receiving portion 44. Portion 44 is configured to slidably receive the scrubber mount 33. The clip 20 clip receives the scrubber 30 and is clipped to a wiper at the wiper receiving portion 42 in order to accommodate bug removal during movement of the wiper about a windshield. Mount 33 preferably includes shoulders 71 for mating engagement with a clip 20 of similar dimension. Shoulders 71 may be rounded. A user may slide one or more clips 20 onto scrubber 30 for subsequent clipping of clip 20 to a wiper at the wiper receiving portion 42.

While this version of the invention has been illustrated and described in detail in the drawings and foregoing description, the same is to be considered as illustrative and not restrictive in character, it being understood that only the preferred embodiment has been shown and described and that all changes and modifications that come within the spirit of the version of the invention are desired to be protected. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

From the foregoing, it will be understood by persons skilled in the art that an improved windshield wiper with means to remove bugs from windshield has been provided. The invention is relatively simple and easy to manufacture, yet affords a variety of uses. While my description contains much specificity, these should not be construed as limitations on the scope of the version of the invention, but rather as an exemplification of the preferred embodiment thereof. The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention. Although this invention has been described in its preferred form with a certain degree of particularity, it is understood that the present disclosure of the preferred form has been made only by way of example and numerous changes in the details of construction and combination and arrangement of parts may be resorted to without departing from the spirit and scope of the invention.

While the present invention has been described with reference to several particular example embodiments, those skilled in the art will recognize that many changes may be made thereto without departing from the spirit and scope of the present invention, which is set forth in the following claims.

I claim:

1. A windshield scrubbing and wiping blade assembly adapted for connection to a windshield wiper arm, the scrubbing and wiping blade assembly comprising;
    an elongated foam-type scrubber engaged with a scrubber rail, and at least one clip connected to said rail, said clip including a base member, a first end wall connected to said base member and a second end wall connected to said base member opposite said first end wall, a first top component connected to said first end wall and a second top component connected to said second end wall, at least one further top component connected to said base member, said further top component including at least one finger projection, said at least one finger projection, base member, first end wall and first top component defining a scrubber receiving portion, and at least another of said finger projections, said base member, second end wall and second top component defining a wiper receiving portion, a wiper mount adapted for holding at least one wiper blade wherein said scrubber is clipped to said wiper mount by insertion of said wiper into said wiper receiving portion in order to accommodate bug removal during movement of the wiper about a windshield,
        where said at least one further top component defines a space between said wiper receiving portion and said scrubber receiving portion, and
        where said wiper receiving portion has a receiving plane defined by a top of said further top component and an ending plane defined by a top of said base member and where said space starts at a level of said receiving plane and extends not further than a level of said ending plane.

2. A windshield wiper clip for connecting a scrubbing blade to a windshield wiper, said clip comprising;
    (a) a base member;
    (b) an end wall integrally connected to said base member and a hook-like end integrally connect to said base member opposite said end wall;
    (c) a first top component connected to said end wall;
    (d) at least one further top component integrally connected to said base member, said further top component including at least one finger projection, said at least one finger projection, base member, end wall and first top component defining a wiper receiving portion, and said base member and hook-like end defining a scrubber receiving portion;
    (e) wherein said clip connects a scrubber and a wiper at the respective receiving portions in order to accommodate bug removal during movement of the wiper about a windshield,
    (f) where said wiper receiving portion contains a bias made of a pliable material and said pliable material is a different material than a material from which said base member is made.

3. A windshield wiper dip according to claim 2 wherein said at least one of said top components includes a taper.

4. A windshield wiper clip according to claim 2 wherein said base member is planer and includes a depression adjacent said wiper receiving portion.

5. A windshield wiper clip according to claim 2 wherein said at least one further top component includes a lip.

6. A windshield scrubber and clip assembly for attachment to a wiper, said assembly comprising:
    an elongated scrubber mount having a generally flat bottom, a generally rounded top, a left side having a generally S-shaped bound and a right side having a generally inverted S-shaped bound;
    a generally elongated foam scrubber engaged with said mount at said bottom; and
    a clip having a base member, a hook-like end integrally connected to said base member, an end wall integrally connected to said base member opposite said hook-like end, a first top component connected to said end wall, at least one further top component integrally connected to said base member, said further top component including at least one finger projection, said at least one finger projection, base member, end wall and top component defining a wiper receiving portion, and said base member and hook-like end defining a scrubber receiving portion configured to slidably receive said scrubber mount;

wherein said dip receives said scrubber and is dipped to a wiper at the wiper receiving portion in order to accommodate bug removal during movement of the wiper about a windshield, and where a space is located within said at least one further top component and said space is between wiper receiving portion and scrubber receiving portion and said space extends to at most a level of a bottom plane of said wiper receiving portion.

7. A windshield wiper clip for connecting a scrubbing blade to a windshield wiper, said clip comprising;

a base member;

an end wall integrally connected to said base member and a hook-like end integrally connect to said base member opposite said end wall;

a first top component connected to said end wall;

at least one further top component integrally connected to said base member, said further top component including at least one finger projection, said at least one finger projection, base member, end wall and first top component defining a wiper receiving portion, and said base member and hook-like end defining a scrubber receiving portion;

wherein said clip connects a scrubber and a wiper at the respective receiving portions in order to accommodate bug removal during movement of the wiper about a windshield, where said wiper receiving portion contains a bias made of a pliable material; and where said pliable material is a sponge material.

8. A windshield scrubber for connection to a windshield wiper, the scrubber comprising:

an elongated foam-type scrubber engaged with a scrubber rail, and at least one clip integrally connected to said rail, said clip including an end wall, top component integrally connected to said end wall, and a finger projection, said finger projection, top component and end wall defining a wiper receiving portion wherein said scrubber is clipped to a wiper by insertion of the wiper into said wiper receiving portion in order to accommodate bug removal during movement of the wiper about a windshield, where a bias is positioned within said wiper receiving portion and said bias is made of a pliable material, and where said pliable material is a different material from which said finger projection, said top component and said end wall are made.

9. A windshield scrubbing and wiping blade assembly adapted for connection to a windshield wiper arm, the scrubbing and wiping blade assembly comprising:

an elongated foam-type scrubber engaged with a scrubber rail, at least one clip integrally connected to said rail, said clip including an end wall, a top component integrally connected to said end wall, and a finger projection, said finger projection, top component and end wall defining a wiper receiving portion, where said wiper receiving portion contains a bias made of a pliable material, and a wiper mount adapted for holding at least one wiper blade wherein said scrubber is clipped to said wiper mount by insertion of said wiper into said wiper receiving portion in order to accommodate bug removal during movement of the wiper about a windshield, and where said pliable material is a different material from which said finger projection, said top component and said end wall are made.

* * * * *